(12) United States Patent
Harada et al.

(10) Patent No.: US 6,366,363 B1
(45) Date of Patent: Apr. 2, 2002

(54) COMMUNICATION APPARATUS AND METHOD

(75) Inventors: Koji Harada, Rennes (FR); Takehiro Yoshida, Tokyo (JP); Hitoshi Saito, Kawasaki (JP); Koji Nishioka, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/190,099

(22) Filed: Nov. 12, 1998

(30) Foreign Application Priority Data

Nov. 18, 1997 (JP) .............................................. 9-317090

(51) Int. Cl.[7] .................................................. H04N 1/00
(52) U.S. Cl. ........................ 358/434; 375/222; 358/468
(58) Field of Search ................................ 358/434, 439, 358/468, 436, 437; 375/222, 377, 220; 370/506, 509, 420

(56) References Cited

U.S. PATENT DOCUMENTS

| | | | | |
|---|---|---|---|---|
| 5,721,731 A | * | 2/1998 | Yoshida ....................... 370/296 |
| 5,732,104 A | * | 3/1998 | Brown et al. ................ 375/222 |
| 6,078,645 A | * | 6/2000 | Cai et al. | |
| 6,088,129 A | * | 7/2000 | Yoshida ....................... 358/439 |
| 6,163,601 A | * | 12/2000 | Kawaguchi ............. 379/100.17 |
| 6,236,469 B1 | * | 5/2001 | Watanabe et al. ........... 358/468 |
| 6,295,313 B1 | * | 9/2001 | Noma et al. | |
| 6,307,881 B1 | * | 10/2001 | Noma et al. | |
| 6,314,170 B1 | * | 11/2001 | Noguchi et al. | |
| 6,320,867 B1 | * | 11/2001 | Bellenger et al. | |

* cited by examiner

*Primary Examiner*—Edward Coles
*Assistant Examiner*—Tia A. Carter
(74) *Attorney, Agent, or Firm*—Fitzpatrick, Cella, Harper & Scinto

(57) ABSTRACT

A communication apparatus and method is arranged such that, when executing a communication protocol conforming to V.34 recommendation, the communication procedure is appropriately recovered even if a second tone signal (a tone A or a tone B) is not received within 2 seconds. A CPU (central processing unit) recognizes a state of execution of the communication procedure by a modem. When the second tone A signal (or tone B signal) has not been received, the CPU causes the modem to receive the tone A signal for a defined time period. When the tone A signal has been received within the defined time period, the CPU returns the communication procedure conforming to the V.34 recommendation by the modem to the first half portion of phase 2.

6 Claims, 6 Drawing Sheets

RESPONSE SIDE   V.34 PHASE 2 (CONFORMING TO RECOMMENDATION)

RESPONSE SIDE V.34 PHASE 2 (PRESENT INVENTION)

COMMUNICATION APPARATUS AND METHOD

BACKGROUND OF THE INVENTION

1. Field of the Invention

The present invention relates to a communication apparatus and method which can execute half-duplex communication conforming to V.34 recommendation.

2. Description of the Related Art

Facsimile apparatuses wich communicate image data according to half-duplex communication conforming to the V.34 recommendation have been known as apparatuses of this kind.

First, a description will be provided of a normal operation in a conventional facsimile apparatus.

FIG. 2 illustrates a communication sequence in a normal operation.

(1) A calling modem transmits $INFO_{oc}$ and a tone B. A response modem receives these signals and transmits $INFO_{oa}$, a tone A and a tone $\overline{A}$.

(2) The calling modem which has received these signals transmits a tone B, a tone $\overline{B}$, and probing signals L1 and L2. The response modem again transmits the tone A.

(3) The calling mode which has received the tone A transmits the tone B. The response modem then transmits INFOh.

(4) The calling modem which has received the INFOh stops the transmission of the tone B, shifts to phase 3, and transmits S, $\overline{S}$, PP and TRN signals.

FIG. 3 is a flowchart illustrating such a normal operation. Since this operation conforms to the V.34 recommendation, further description thereof will be omitted.

Next, a description will be provided of a conventional recovery operation conforming to the V.34 recommendation when the calling modem at the transmission side cannot normally receive the second tone A from the response modem described in item (2), with reference to FIG. 3.

Processing in items (1) and (2) is the same as in the normal operation. Then, according to the V.34 recommendation, if the calling modem cannot detect the tone A within 2,700 ms, the calling modem transmits the tone B and awaits transmission of the tone A and the tone $\overline{A}$. This indicates return to point x shown in FIG. 3. According to the V.34 recommendation, since the tone B is not transmitted from the calling modem, the response modem transmits the INFOh if the tone B cannot be detected while transmitting the tone A for 2,000 ms, and shifts to phase 3.

However, in the above-described conventional recovery operation, if the second tone A cannot be normally received at the calling modem, the calling modem returns to the processing of the first half portion of phase 2, and the response mode shifts to phase 3. As a result, communication cannot be recovered, resulting in error ending.

SUMMARY OF THE INVENTION

It is an object of the present invention to solve the above-described problems.

According to one aspect, the present invention which achieves the above-described object relates to a communication apparatus capable of executing a communication protocol conforming to V.34 recommendation. The apparatus includes means for detecting a second tone B signal from a calling modem for a defined time period when the second tone B signal has not been received for a predetermined time period, and means for returning a communication procedure conforming to the V.34 recommendation to phase 2 when the detection means has detected the second tone B signal within the defined time period.

According to another aspect, the present invention which achieves the above-described object relates to a communication apparatus capable of executing a communication protocol conforming to V.34 recommendation. The apparatus includes means for detecting a second tone A signal from a response modem for a defined time period when the second tone A signal has not been received for a predetermined time period, and means for returning a communication procedure conforming to the V.34 recommendation to phase 2 when the second tone A signal has been detected within the defined time period.

According to still another aspect, the present invention which achieves the above-described object relates to a communication method capable of executing a communication procedure conforming to V.34 recommendation. The method includes the steps of detecting a second tone B signal from a calling modem for a defined time period in a response modem when the second tone B signal has not been received for a predetermined time period, and returning the communication procedure conforming to the V.34 recommendation to phase 2 when the second tone B signal has been detected within the defined time period.

According to yet another aspect, the present invention which achieves the above-described object relates to a communication method capable of executing a communication procedure conforming to V.34 recommendation. The method includes the steps of detecting a second tone A signal from a response modem for a defined time period when the second tone A signal has not been received for a predetermined time period, and returning the communication procedure conforming to the V.34 recommendation to phase 2 when the second tone A signal has been detected within the defined time period.

According to yet a further aspect, the present invention which achieves the above-described object relates to a control method for controlling a modem having a function of executing a communication protocol conforming to V.34 recommendation. The method includes the steps of recognizing a state of execution of the communication protocol by the modem by reading information from a predetermined register within the modem, determining whether or not a second tone B signal from a calling modem is received by the modem for a defined time period when it is identified that the second tone B signal has not been received for a predetermined time period, when the modem operates as a response modem, and returning the communication protocol conforming to the V.34 recommendation to phase 2 to be executed by the modem when the second tone B signal has been received within the defined time period.

According to still another aspect, the present invention which achieves the above-described object relates to a control method for controlling a modem having a function of executing a communication protocol conforming to V.34 recommendation. The method includes the steps of recognizing a state of execution of the communication protocol by the modem by reading information from a predetermined register within the modem, determining whether or not a second tone A signal from a response modem is received by the modem for a defined time period if it is identified that the second tone A signal has not been received for a predetermined time period, when the modem operates as a calling modem, and returning the communication protocol conforming to the V.34 recommendation to phase 2 to be executed by the modem when the second tone A signal has been received within the defined time period.

The foregoing and other objects, advantages and features of the present invention will become more apparent from the following detailed description of the preferred embodiment taken in conjunction with the accompanying drawings.

DETAILED DESCRIPTION OF THE PREFERRED EMBODIMENT

A preferred embodiment of the present invention will now be described in detail with reference to the drawings.

Figure 1:
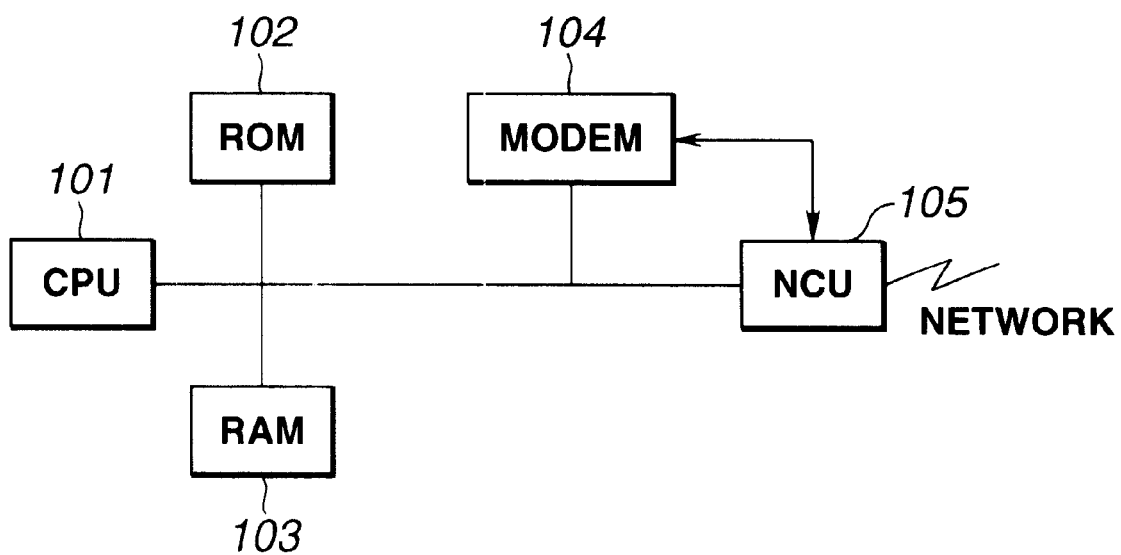
FIG. 1 is a block diagram illustrating the configuration of a communication apparatus according to an embodiment of the present invention.

FIG. 1 is a block diagram illustrating the configuration of a communication apparatus according to the embodiment.

In FIG. 1, a CPU (central processing unit, including a microprocessor and the like) 101 controls the entire apparatus. A ROM (read-only memory) 102 stores control programs to be executed by the CPU 101. A RAM (random access memory) 103 is used as a working area for executing a program by the CPU 101, and for storage of communication data. A modem (modulator-demodulator) 104 can execute a communication operation based on the V.34 recommendation. An NCU (network control unit) 105 operates as an interface with a public network (PSTN (public switched telephone network)). In addition to the units shown in FIG. 1, the communication apparatus of the embodiment includes a reading unit (reader) for reading an original, a recording unit (recorder) for recording image data, a codec (coder-decoder) unit for performing encoding/expansion of image data, and the like.

Next, a description will be provided of an operation when the communication apparatus transmits communication data stored in the RAM 103.

First, the CPU 101 performs network connection with an arbitrary communication partner by controlling the NCU 105 in accordance with a transmission program stored in the ROM 102, and then transfers data from the RAM 103 to the modem 104 by executing a communication protocol conforming to the V.34 recommendation or the like by controlling the modem 104. The modem 104 modulates the data and transmits the resultant data to the network via the NCU 105. In reception processing, an operation reverse to the operation in transmission processing is executed.

The modem 104 of the embodiment has the function of automatically executing a communication procedure conforming to the V.34 recommendation, and is configured so as to sequentially write status information indicating a status of execution by the modem 104 in a status register provided in the modem 104. The CPU 101 grasps the state of progress of the communication procedure by reading and identifying information stored in the status register of the modem 104. When a situation inconvenient for executing the communication procedure occurs and processing of recovering the communication procedure is required, the CPU 101 controls the modem 104 so as to execute the processing of recovering the communication procedure (for example, to again execute the procedure from an arbitrary point).

Figure 4:
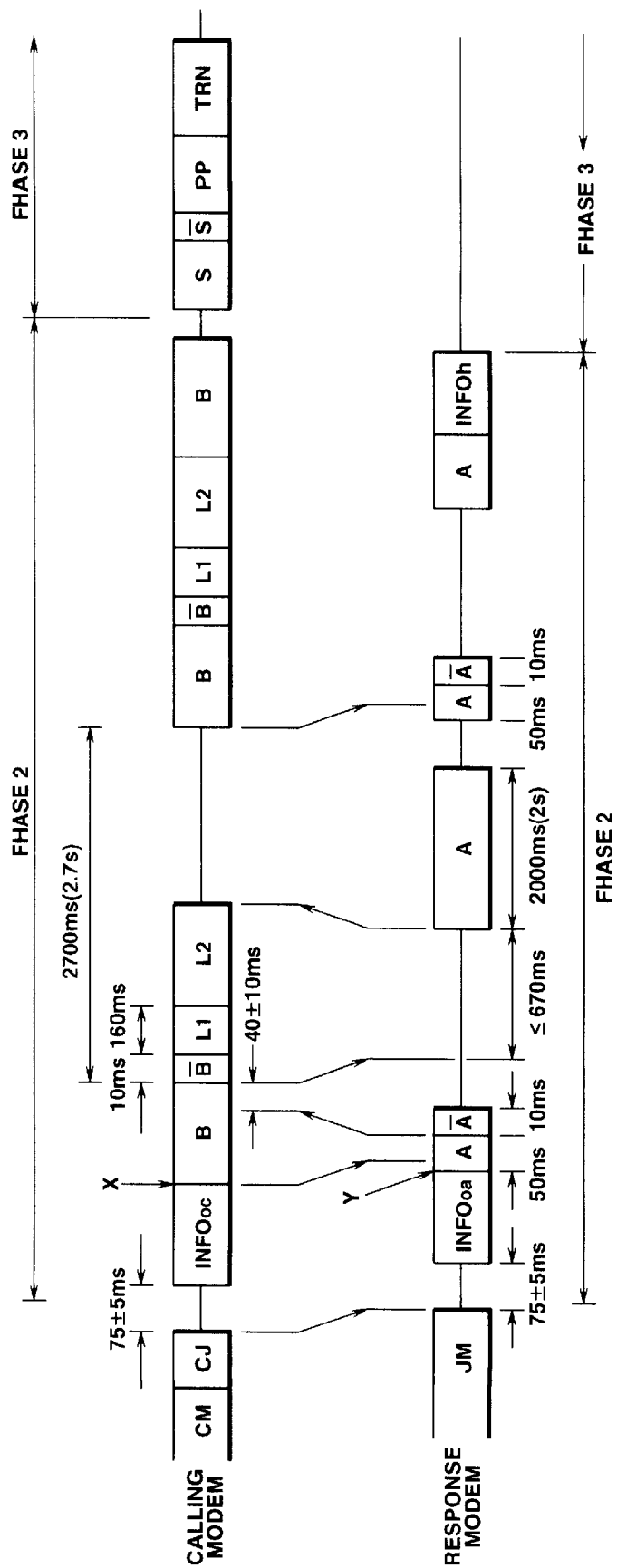
FIG. 4 is a diagram illustrating a communication sequence performed by the communication apparatus shown in FIG. 1.
Figure 5:
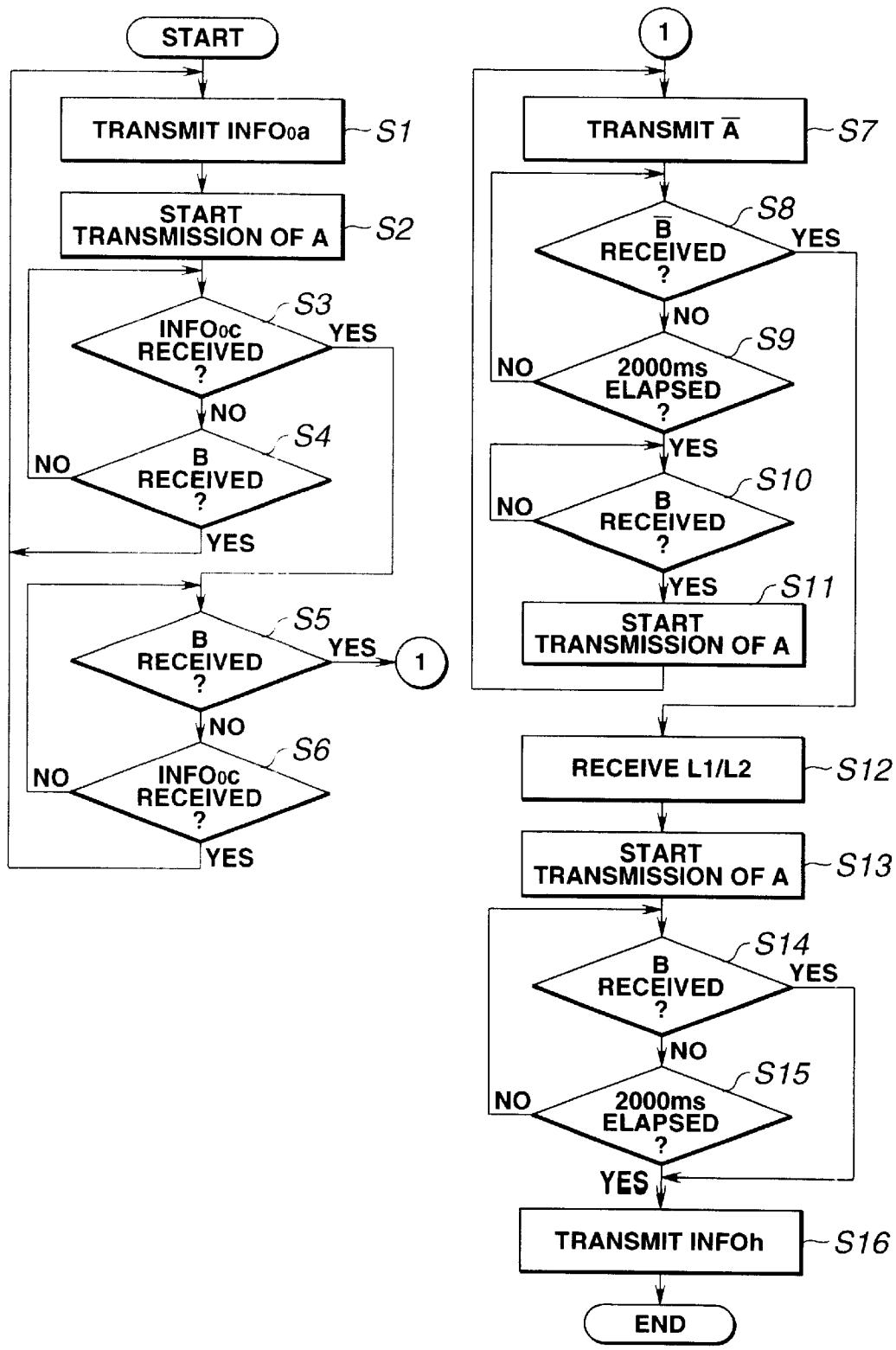
FIG. 5 is a flowchart for executing a conventional communication sequence conforming to the V.34 recommendation.
Figure 6:
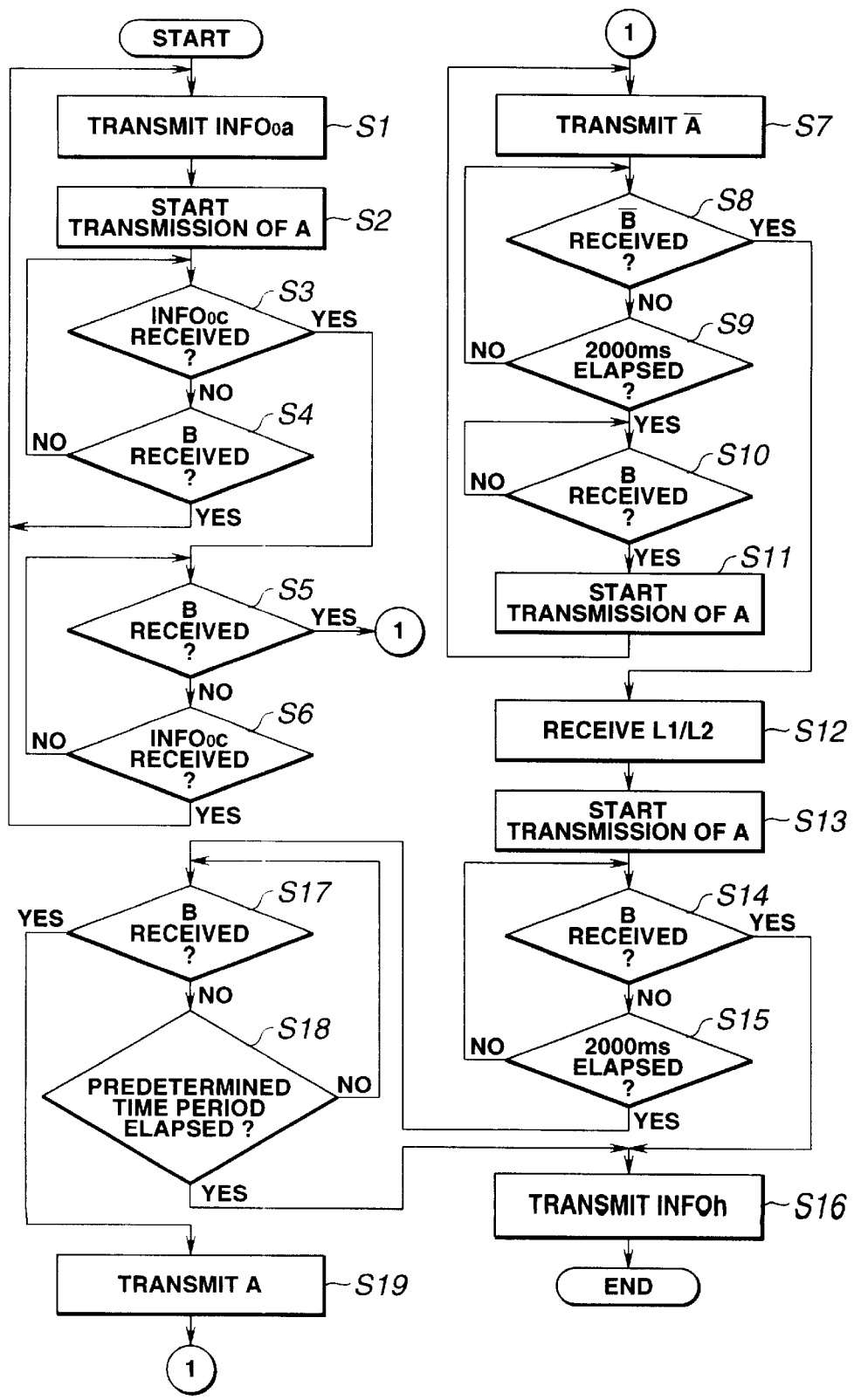
FIG. 6 is a flowchart illustrating a communication sequence according to the embodiment.

Next, a description will be provided of a recovery operation by the CPU 101 in the communication apparatus of the embodiment, with reference to the diagram indicating a communication sequence shown in FIG. 4. FIG. 6 is a flowchart illustrating this operation.

(1) A calling modem transmits $INFO_{oc}$ and a tone B. A response modem receives these signals (steps S3 and S4) and transmits $INFO_{oa}$, a tone A and a tone $\overline{A}$ (steps S1, S2 and S7).

(2) The calling modem which has received these signals transmits a tone B, a tone $\overline{B}$, and probing signals L1 and L2. The response modem again transmits the tone A (step S13).

(3) Then, according to the V.34 recommendation, if the calling modem cannot detect the tone A within 2,700 ms, the calling modem transmits the tone B and awaits transmission of the tone A and the tone $\overline{A}$. This indicates return to point x shown in FIG. 4. Since the tone B is not tramsitted from the calling modem, the response modem cannot receive the tone B while transmitting the tone A for 2,000 ms (steps S14 and S15). When the CPU 101 recognizes the above-described situation by monitoring information stored in the status register of the modem 104, the CPU 101 causes the modem 104 to stop the transmission of the tone A and to receive the tone B for a defined time period, and determines whether or not the tone B signal is received within the defined time period by reading information stored in the status register within the modem 104 (steps S17 and S18). If the result of the determination is affirmative, the CPU 101 controls the modem 104 so as to return the communication procedure to the first half portion (point Y) of phase 2. Then, the CPU 10 causes the modem 104 to transmit the tone A and the tone $\overline{A}$ (steps S19 and S7), again execute the processing of phase 2, execute recovery processing, and normally shift to phase 3. It is reason able to set the above-described defined time period for detecting the tone B to about 2,000 ms (2 seconds).

Although in the foregoing description, the CPU 101 performs recovery processing by controlling the modem 104, the modem 104 itself may control recovery processing instead of the CPU 101. In this case, automatic recovery processing by the modem 104 is performed without intervention of the CPU Although in the foregoing description, the calling modem operates as the transmission modem, the present invention may also be applied to a case in which the response modem operates as the transmission modem, as in the case of polling transmission or the like. In this case, the calling modem, the tone A and the tone $\overline{A}$ may be replaced by the response modem, the tone B and the tone $\overline{B}$.

As described above, according to the present invention, when the second tone signal (a tone B signal or a tone A signal) from the modem in communication cannot be received during the processing of phase 2 of a communication protocol conforming to V.34 recommendation, it is possible to once again perform the processing of phase 2, and to appropriately recover a communication procedure. It is thereby possible to minimize error ending of the communication protocol conforming to the V.34 recommendation.

The individual components designated by blocks in the drawings are all well known in the communication apparatus and method arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus capable of executing a communication protocol conforming to a V.34 recommendation during execution of phase 2, said apparatus comprising, when receiving a signal at a called side:

detection means for detecting a second tone B signal from a calling modem for a defined time period when the second tone B signal has not been received for a predetermined time period; and means for returning a communication procedure conforming to the V.34 recommendation to phase 2 when said detection means has detected the second tone B signal within the defined time period.

2. A communication apparatus according to claim 1, wherein the communication procedure is returned to a predetermined point of a first half portion of phase 2.

3. A communication apparatus according to claim 1, wherein the defined time period is 2 seconds.

4. A communication method capable of executing a communication procedure conforming to a V.34 recommendation during execution of phase 2, said method comprising, when receiving a signal at a called side, the steps of:

detecting a second tone B signal from a calling modem for a defined time period in a response modem when the second tone B signal has not been received for a predetermined time period; and returning the communication procedure conforming to the V.34 recommendation to phase 2 when the second tone B signal has been detected within the defined time period.

5. A communication method according to claim 4, wherein the defined time period is 2 seconds.

6. A control method for controlling a modem having a function of executing a communication protocol conforming to a V.34 recommendation during execution of phase 2, said method comprising, when receiving a signal at a called side, the steps of:

recognizing a state of execution of the communication protocol by the modem by reading information from a predetermined register within the modem;

determining whether or not a second tone B signal from a calling modem is received by the modem for a defined time period when it is identified that the second tone B signal has not been received for a predetermined time period, when the modem operates as a response modem; and returning the communication protocol conforming to the V.34 recommendation to phase 2 to be executed by the modem when the second tone B signal has been received within the defined time period.

* * * * *

UNITED STATES PATENT AND TRADEMARK OFFICE
CERTIFICATE OF CORRECTION

PATENT NO. : 6,366,363 B1  Page 1 of 1
DATED : April 2, 2002
INVENTOR(S) : Koji Harada et al.

Figure 2:
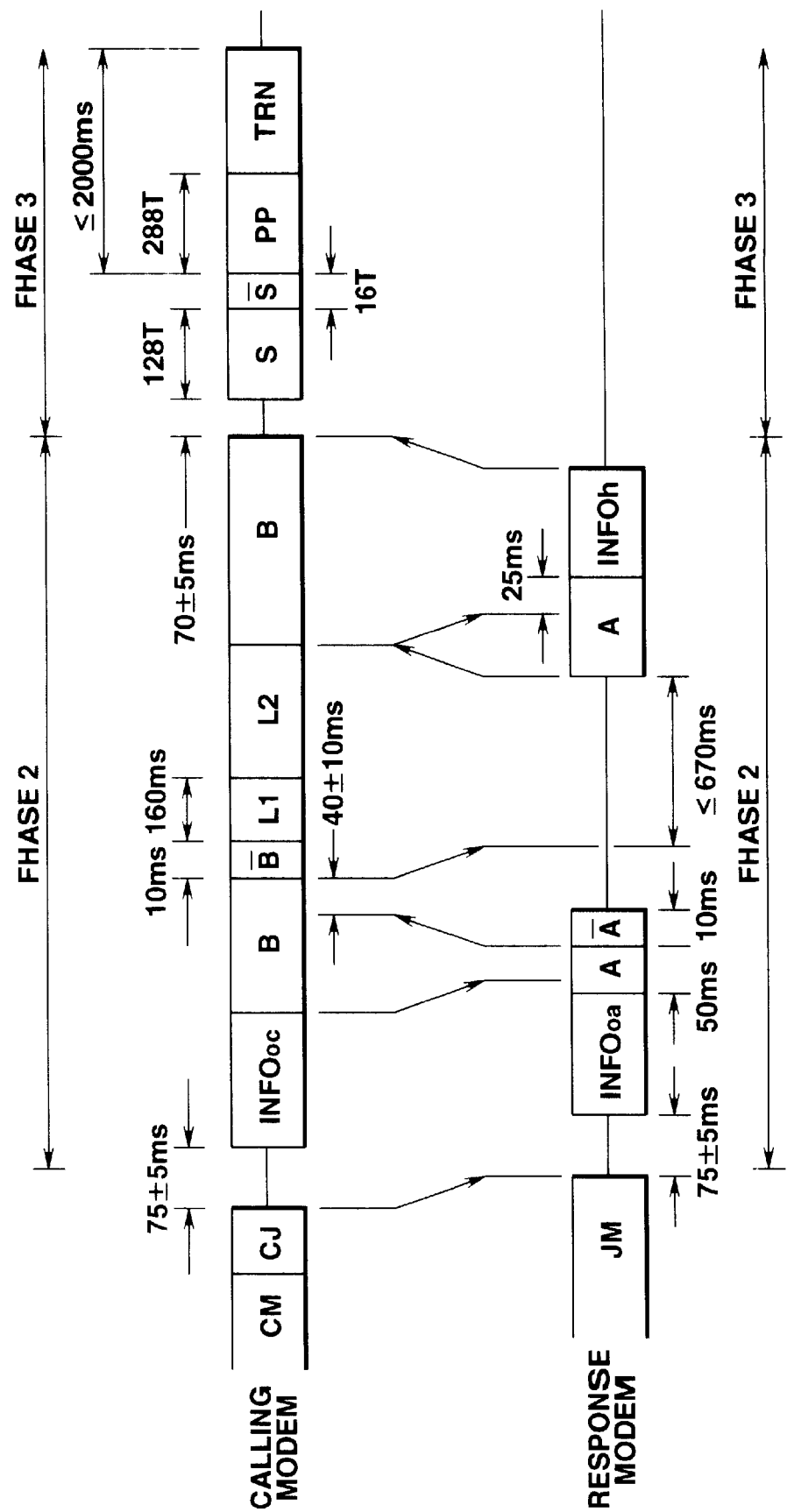
FIGS. 2 and 3 are diagrams illustrating conventional communication sequences conforming to V.34 recommendation.
Figure 3:
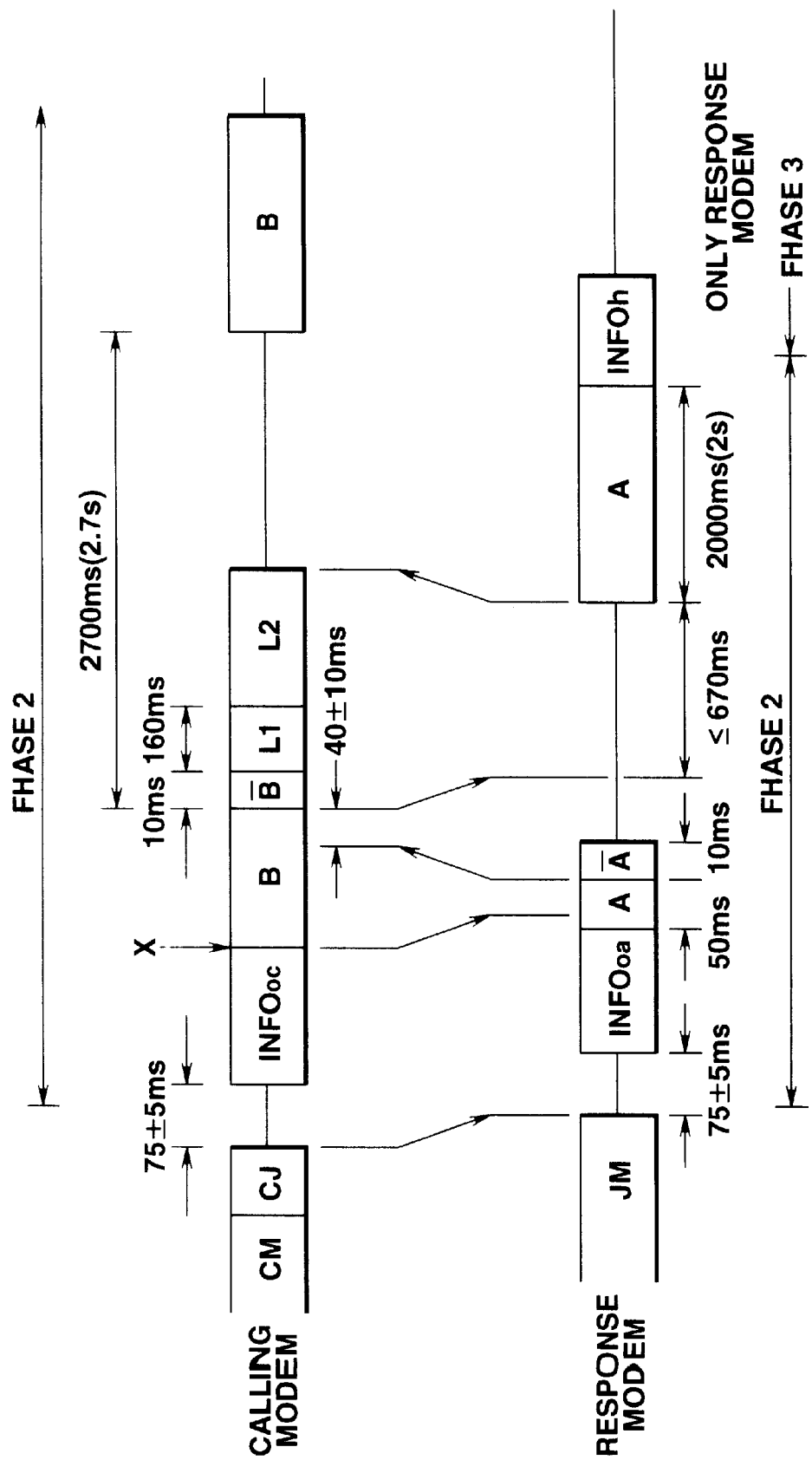

It is certified that error appears in the above-identified patent and that said Letters Patent is hereby corrected as shown below:

Drawings,
Sheet 2, Figure 2, "FHASE 2" (both occurrences) should read -- PHASE 2 --; and "FHASE 3" (both occurrences) should read -- PHASE 3 --.
Sheet 3, Figure 3, "FHASE 2" (both occurrences) should read -- PHASE 2 --; and "FHASE 3" (both occurrences) should read -- PHASE 3 --.
Sheet 4, Figure 4, "FHASE 2" (both occurrences) should read -- PHASE 2 --; and "FHASE 3" (both occurrences) should read -- PHASE 3 --.

Column 4,
Line 42, "reason able" should read -- reasonable --.
Line 50, "CPU" should read -- CPU 101. --.

Signed and Sealed this

Fourth Day of June, 2002

Attest:

Attesting Officer

JAMES E. ROGAN
*Director of the United States Patent and Trademark Office*